US012659676B2

(12) United States Patent
Pedersen et al.

(10) Patent No.: US 12,659,676 B2
(45) Date of Patent: Jun. 16, 2026

(54) HEARING DEVICE AND METHOD OF UPDATING A HEARING DEVICE

(71) Applicant: GN Hearing A/S, Ballerup (DK)

(72) Inventors: Brian Dam Pedersen, Ringsted (DK); Allan Munk Vendelbo, Valby (DK)

(73) Assignee: GN HEARING A/S, Ballerup (DK)

( * ) Notice: Subject to any disclaimer, the term of this patent is extended or adjusted under 35 U.S.C. 154(b) by 0 days.

(21) Appl. No.: 18/745,675

(22) Filed: Jun. 17, 2024

(65) Prior Publication Data

US 2024/0340600 A1 Oct. 10, 2024

Related U.S. Application Data

(63) Continuation of application No. 18/317,713, filed on May 15, 2023, now Pat. No. 12,041,419, which is a continuation of application No. 17/842,583, filed on Jun. 16, 2022, now Pat. No. 11,689,870, which is a continuation of application No. 17/151,454, filed on Jan. 18, 2021, now Pat. No. 11,395,075, which is a continuation of application No. 16/224,649, filed on Dec. 18, 2018, now Pat. No. 11,297,447, which is a continuation of application No. 15/941,816, filed on
(Continued)

(30) Foreign Application Priority Data

Jul. 2, 2015 (DK) ........................... PA 2015 70436
Jul. 2, 2015 (EP) ..................................... 15175140

(51) Int. Cl.
*H04R 25/00* (2006.01)

(52) U.S. Cl.
CPC ........... *H04R 25/55* (2013.01); *H04R 25/554* (2013.01); *H04R 2225/55* (2013.01); *H04R 2225/61* (2013.01)

(58) Field of Classification Search
CPC .............................. H04R 25/55; H04R 25/554
See application file for complete search history.

(56) References Cited

U.S. PATENT DOCUMENTS 5,757,920 A 5/1998 Misra et al.
5,809,140 A 9/1998 Rubin et al.
(Continued)

FOREIGN PATENT DOCUMENTS

DE 102 00 796 A1 7/2003
DK 2013 70266 A1 11/2014
(Continued)

OTHER PUBLICATIONS

Non-Final Office Action for U.S. Appl. No. 18/317,713 dated Nov. 29, 2023.
(Continued)

*Primary Examiner* — Olisa Anwah
(74) *Attorney, Agent, or Firm* — Vista IP Law Group, LLP

(57) ABSTRACT

A hearing device includes: a processing unit configured to compensate for hearing loss of a user of the hearing device; a memory unit; and an interface; wherein the processing unit is configured to obtain one or more security settings via the interface, the one or more security settings comprising a hearing device key identifier, verify the one or more security settings, and update the hearing device based on the one or more security settings if the one or more security settings are verified.

19 Claims, 8 Drawing Sheets

Related U.S. Application Data

Mar. 30, 2018, now Pat. No. 10,306,379, which is a continuation of application No. 15/623,266, filed on Jun. 14, 2017, now Pat. No. 10,057,694, which is a continuation of application No. 14/799,463, filed on Jul. 14, 2015, now Pat. No. 10,158,953.

(56) References Cited

U.S. PATENT DOCUMENTS

| | | | | |
|---|---|---|---|---|
| 6,055,575 | A | 4/2000 | Paulsen | |
| 6,556,686 | B1 | 4/2003 | Weidner | |
| 6,658,307 | B1 | 12/2003 | Mueller | |
| 6,724,862 | B1 | 4/2004 | Shafferl | |
| 8,166,312 | B2 | 4/2012 | Waldmann et al. | |
| 8,670,355 | B1 | 3/2014 | Frerking | |
| 8,812,851 | B2 | 8/2014 | Schwarz | |
| 9,219,966 | B2 | 12/2015 | Wang | |
| 9,402,179 | B1 | 7/2016 | Miller | |
| 9,608,807 | B2 | 3/2017 | Pedersen et al. | |
| 9,613,028 | B2 | 4/2017 | Foo | |
| 9,877,123 | B2 | 1/2018 | Pedersen | |
| 9,887,848 | B2 | 2/2018 | Pedersen | |
| 2002/0054689 | A1* | 5/2002 | Zhang | G06F 8/65 381/314 |
| 2002/0169717 | A1 | 11/2002 | Challener | |
| 2002/0196159 | A1 | 12/2002 | Lesenne et al. | |
| 2004/0071304 | A1 | 4/2004 | Yanz | |
| 2004/0117650 | A1 | 6/2004 | Karaoguz et al. | |
| 2004/0117818 | A1 | 6/2004 | Karaoguz et al. | |
| 2004/0125958 | A1 | 7/2004 | Brewster | |
| 2004/0162980 | A1 | 8/2004 | Lesenne et al. | |
| 2005/0154889 | A1 | 7/2005 | Ashley et al. | |
| 2006/0005237 | A1 | 1/2006 | Kobata et al. | |
| 2006/0078124 | A1 | 4/2006 | Whelan et al. | |
| 2006/0129848 | A1 | 6/2006 | Paksoy | |
| 2007/0078866 | A1 | 4/2007 | Takashima | |
| 2007/0083757 | A1 | 4/2007 | Nakano et al. | |
| 2008/0049957 | A1 | 2/2008 | Topholm | |
| 2009/0210699 | A1 | 8/2009 | Grewal et al. | |
| 2010/0067711 | A1 | 3/2010 | Waldmann | |
| 2010/0104122 | A1 | 4/2010 | Waldmann | |
| 2010/0205447 | A1 | 8/2010 | Waldmann | |
| 2010/0290627 | A1 | 11/2010 | Tsuji et al. | |
| 2010/0306525 | A1 | 12/2010 | Ferguson | |
| 2011/0188684 | A1 | 8/2011 | Spieler et al. | |
| 2011/0293124 | A1 | 12/2011 | Ma | |
| 2012/0036364 | A1 | 2/2012 | Yoneda et al. | |
| 2012/0110333 | A1 | 5/2012 | Lukkarila et al. | |
| 2012/0140962 | A1* | 6/2012 | Ubezio | H04R 25/558 381/314 |
| 2012/0252411 | A1 | 10/2012 | Johnsgard et al. | |
| 2012/0252531 | A1 | 10/2012 | King | |
| 2013/0024798 | A1 | 1/2013 | Scheider | |
| 2013/0077791 | A1 | 3/2013 | Kozuka et al. | |
| 2013/0177188 | A1 | 7/2013 | Apfel | |
| 2013/0177189 | A1 | 7/2013 | Bryant | |
| 2013/0202138 | A1 | 8/2013 | Nishizaki et al. | |
| 2013/0251179 | A1 | 9/2013 | Aschoff et al. | |
| 2013/0257364 | A1 | 10/2013 | Redding | |
| 2013/0290733 | A1 | 10/2013 | Branton et al. | |
| 2013/0290734 | A1 | 10/2013 | Branton et al. | |
| 2013/0318357 | A1 | 11/2013 | Abraham et al. | |
| 2013/0329924 | A1 | 12/2013 | Fleizach | |
| 2014/0004825 | A1 | 1/2014 | Prakash | |
| 2014/0050341 | A1 | 2/2014 | Flynn | |
| 2014/0193008 | A1 | 7/2014 | Zukic | |
| 2014/0211973 | A1 | 7/2014 | Wang et al. | |
| 2014/0289516 | A1 | 9/2014 | Sahay | |
| 2014/0331064 | A1 | 11/2014 | Ballesteros | |
| 2014/0334629 | A1 | 11/2014 | Andersen et al. | |
| 2014/0341405 | A1 | 11/2014 | Pedersen et al. | |
| 2015/0023512 | A1 | 1/2015 | Shennib | |
| 2015/0023534 | A1 | 1/2015 | Shennib | |
| 2015/0289062 | A1 | 10/2015 | Ungstrup | |
| 2016/0142838 | A1 | 5/2016 | Thomsen | |
| 2016/0198271 | A1 | 7/2016 | Shennib | |
| 2016/0255448 | A1 | 9/2016 | Morant | |
| 2016/0337769 | A1 | 11/2016 | Siddhartha | |
| 2017/0006902 | A1 | 1/2017 | Pedersen | |
| 2017/0099550 | A1 | 4/2017 | Blessing | |
| 2017/0180419 | A1 | 6/2017 | Pedersen et al. | |
| 2017/0180886 | A1 | 6/2017 | Van Der Loo | |
| 2017/0286918 | A1 | 10/2017 | Westermann | |
| 2017/0318400 | A1* | 11/2017 | Westermann | H04R 25/70 |
| 2017/0318457 | A1 | 11/2017 | Westermann | |

FOREIGN PATENT DOCUMENTS

| | | | |
|---|---|---|---|
| EP | 1 582 958 A2 | 10/2005 |
| EP | 2 760 225 A1 | 7/2014 |
| EP | 2 928 212 A1 | 10/2015 |
| EP | 3 021 545 A1 | 5/2016 |
| EP | 3 032 845 A1 | 6/2016 |
| WO | WO 2006/003532 A1 | 1/2006 |
| WO | WO 2007/098605 A1 | 9/2007 |
| WO | WO 2007/144435 A2 | 12/2007 |
| WO | WO 2007/144435 A3 | 12/2007 |
| WO | WO 2013/091693 A1 | 6/2013 |
| WO | WO 2014/094866 A1 | 6/2014 |
| WO | WO 2015132419 A2 | 9/2015 |
| WO | WO 2016/078711 | 5/2016 |
| WO | WO 2016/096011 | 6/2016 |

OTHER PUBLICATIONS

Notice of Allowance for U.S. Appl. No. 18/317,713 dated Mar. 6, 2024.

Non-Final Office Action for U.S. Appl. No. 17/842,583 dated Dec. 2, 2022.

Amendment Response to NFOA for U.S. Appl. No. 17/842,583 dated Mar. 1, 2023.

Notice of Allowance for U.S. Appl. No. 17/842,583 dated Mar. 9, 2023.

Final Office Action for U.S. Appl. No. 17/151,454 dated Jan. 5, 2022.

Non-Final Office Action for U.S. Appl. No. 17/151,454 dated Sep. 8, 2021.

Notice of Allowance for U.S. Appl. No. 17/151,454 dated Mar. 16, 2022.

Foreign Summons for EP Patent Appln. No. 15175140.1 dated Feb. 4, 2022.

Extended European Search Report dated Nov. 20, 2015 for related EP Patent Application No. 15175137.7.

Extended European Search Report dated Dec. 14, 2015 for related EP Patent Application No. 15175135.1.

Joann Spera, "SSL client authentication: It's a matter of trust", Mar. 2, 1998.

Li Wei, "Improvement Method of SSL Protocol Identity Authentication based on the Attribute Certificate", 2012 International Conference on Computer Science and Service System, IEEE Computer Society, Aug. 11, 2012.

Extended European Search Report dated Jan. 4, 2016 for related EP Patent Application No. 151751378.5.

John Padgette, et al., "Guide to Bluetooth Security Recommendations of the National Institute of Standards and Technology", Jun. 2012.

"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.

"Message Sequence Charts, 4 Optional Activities After ACL Connection Establishment, 4.2 Simple Pairing Message Sequence Charts" In: Bluetooth Specification v4.0, Core System Package, Bluetooth.com, vol. 2, Jun. 30, 2010.

"Security Specification In: Bluetooth Specification v4.0, Core System Package", Bluetooth.com, vol. 2, Jun. 30, 2010.

Extended European Search Report dated Dec. 14, 2015 for related EP Patent Application No. 15175141.9.

Vincent Bernat: "Speeding up SSL: enabling session reuse", Sep. 27, 2011.

(56) References Cited

OTHER PUBLICATIONS

Extended European Search Report dated Dec. 23, 2015 for related EP Patent Application No. 15175139.3.
Leicher A et al., "Implementation of a Trusted Ticket System", Emerging Challenges for Security, Privacy and Trust. IFIP Advances in Information and Communication Technology, vol. 297, Jan. 1, 2009.
First Technical Examination and Search Report dated Jan. 25, 2016 for corresponding/related Danish Patent Application No. PA 2015 70437, 5 pages (P2337).
Extended European Search Report dated Jan. 11, 2016 for corresponding/related EP Patent Application No. 15175142.7, 10 pages (P2334).
Gary C. Kessler, "An Overview of Cryptography", Nov. 17, 2006.
Menezes et al., "Handbook of Applied Cryptography, Key Management Techniques", Jan. 1, 1997.
First Technical Examination and Search Report dated Feb. 23, 2016 for corresponding/related Danish Patent Application No. PA 2015 70435, 5 pages (P2335).
Extended European Search Report dated Jan. 12, 2016 for corresponding/related EP Patent Application No. 15175140.1, 8 pages (P2336).
First Technical Examination and Search Report dated Feb. 25, 2016 for corresponding/related Danish Patent Application No. PA 2015 70436 (P2336).
First Technical Examination and Search Report dated Feb. 25, 2016 for corresponding/related Danish Patent Application No. PA 2015 70434 (P2338).
First Technical Examination and Search Report dated Feb. 22, 2016 for corresponding/related Danish Patent Application No. PA 2015 70432 (P2339).
First Technical Examination and Search Report dated Feb. 29, 2016 for corresponding/related Danish Patent Application No. PA 2015 70433 (P2343).
First Technical Examination and Search Report dated Feb. 25, 2016 for corresponding/related Danish Patent Application No. PA 2015 70438 (P2334).
Non-final Office Action dated Sep. 22, 2016 for related U.S. Appl. No. 14/793,515.
Non-final Office Action dated Sep. 26, 2016 for related U.S. Appl. No. 14/799,402.
Non-final Office Action dated Sep. 30, 2016 for related U.S. Appl. No. 14/799,437.
Non-final Office action dated Oct. 7, 2016 for related U.S. Appl. No. 14/793,587.
Notice of Allowance and Fees Due dated Jan. 19, 2017 for related U.S. Appl. No. 14/793,466.
Non-final Office Action dated Feb. 10, 2017 for related U.S. Appl. No. 14/799,463.
Final Office Action dated Mar. 9, 2017 for U.S. Appl. No. 14/793,515.
Final Office Action dated Feb. 17, 2017 for related U.S. Appl. No. 14/799,402.
Notice of Allowance and Fees Due dated May 18, 2017 for related U.S. Appl. No. 14/799,338.
Final Office Action dated May 12, 2017 for related U.S. Appl. No. 14/793,587.
Second Technical Examination and Search Report dated Apr. 5, 2017 for corresponding/related Danish Patent Application No. PA 2015 70432, 3 pages (P2339).
Final Office Action dated May 30, 2017 for related U.S. Appl. No. 14/799,437.
Advisory Action dated Jun. 22, 2017 for related U.S. Appl. No. 14/793,515.
Notice of Allowance and Fee(s) due dated Jun. 23, 2017 for related U.S. Appl. No. 14/799,463.
Notice of Allowance and Fee(s) due dated Jul. 11, 2017 for related U.S. Appl. No. 14/799,402.
Non-final Office Action dated Jul. 20, 2017 for related U.S. Appl. No. 15/595,526.
Non-final Office Action dated Aug. 14, 2017 for related U.S. Appl. No. 14/793,515.
Notice of Allowance and Fee(s) dated Aug. 24, 2017 for related U.S. Appl. No. 14/799,463.
Notice of Allowance and Fee(s) dated Sep. 13, 2017 for related U.S. Appl. No. 14/799,338.
Second Technical Examination dated Jul. 21, 2017 for corresponding/related Danish Patent Application No. PA 2015 70434, 3 pages (P2338).
Non-final Office Action dated Sep. 27, 2017 for related U.S. Appl. No. 15/697,406.
Advisory Action dated Oct. 23, 2017 for related U.S. Appl. No. 14/799,437.
Notice of Allowance and Fee(s) dated Oct. 6, 2017 for related U.S. Appl. No. 14/799,402.
Advisory Action dated Nov. 16, 2017 for related U.S. Appl. No. 14/793,587.
Notice of Allowance and Fee(s) due dated Nov. 3, 2017 for related U.S. Appl. No. 15/595,526.
Non-final Office Action dated Dec. 21, 2017 for related U.S. Appl. No. 14/799,437.
Non-final Office Action dated Jan. 26, 2018 for related U.S. Appl. No. 14/799,463.
Communication pursuant to Article 94(3) dated Dec. 8, 2017 for related EP Patent Application No. 15175135.1.
Final Office Acction dated Apr. 2, 2018 for related U.S. Appl. No. 14/793,515.
Non Final Office Action dated Apr. 20, 2018 for related U.S. Appl. No. 15/888,583.
Final Office Action dated May 17, 2018 for related U.S. Appl. No. 14/799,463.
Notice of Allowance dated May 3, 2018 for related U.S. Appl. No. 14/793,587.
Advisory Action dated Jun. 25, 2018 for related U.S. Appl. No. 14/793,515.
Non-final Office Action dated Jul. 21, 2017 for related U.S. Appl. No. 15/623,266.
Final Office Action dated Dec. 14, 2017 for related U.S. Appl. No. 15/623,266.
Adivsory Action dated Mar. 7, 2018 for related U.S. Appl. No. 15/623,266.
Notice of Allowance dated Mar. 27, 2018 for related U.S. Appl. No. 15/623,266.
Communication pursuant to Article 94(3) dated Jan. 3, 2018 for corresponding EP Patent Application No. 15175141.9.
Final Office Action dated Jul. 5, 2018 for related U.S. Appl. No. 14/799,437.
Notice of Allowance and Fee(s) dated Jul. 31, 2018 for related U.S. Appl. No. 14/793,515.
Notice of Allowance and Fee(s) dated Aug. 1, 2018 for related U.S. Appl. No. 14/799,463.
Notice of Allowance and Fee(s) dated Jan. 24, 2019 for related U.S. Appl. No. 14/799,437.
Advisory Action dated Mar. 12, 2019 for related U.S. Appl. No. 15/697,406.
Summons to attend to Oral Proceedings dated Jan. 31, 2019 for corresponding EP Application No. 15175141.9.
Torsten Lodderstedt, et al. "OAuth 2.0 Threat Model and Security Considerations IETF" Jan. 31, 2013. pp. 1-71.
Final Office Action dated Sep. 19, 2018 for related U.S. Appl. No. 15/697,406.
Final Office Action dated Sep. 21, 2018 for related U.S. Appl. No. 15/941,816.
Adivisory Action dated Oct. 25, 2018 for related Patent U.S. Appl. No. 14/799,437.
Notice of Allowance and Fee(s) dated Nov. 2, 2018 for related U.S. Appl. No. 15/888,583.
Non-Final Office Action for U.S. Appl. No. 15/941,816 dated May 11, 2018.
Final Office Action for U.S. Appl. No. 15/941,816 dated Sep. 21, 2018.
Amendment Response to NFOA for U.S. Appl. No. 15/941,816 dated Aug. 3, 2018.
Amendment Response to FOA for U.S. Appl. No. 15/941,816 dated Dec. 17, 2018.

(56) References Cited

OTHER PUBLICATIONS

Notice of Allowance for U.S. Appl. No. 15/941,816 dated Jan. 9, 2019.
Foreign Office Action dated Aug. 4, 2020 for Japanese Appln. No. 2016-130840.
Foreign Communication for EP Patent Appln. No. 15175140.1 dated Sep. 17, 2020.
Non-Final Office Action for U.S. Appl. No. 16/224,649 dated Apr. 20, 2020.
Amendment Response to NFOA for U.S. Appl. No. 16/224,649 dated Sep. 21, 2020.
Notice of Allowance for U.S. Appl. No. 16/224,649 dated Jan. 22, 2021.
Notice of Allowance for U.S. Appl. No. 16/224,649 dated May 3, 2021.
Notice of Allowance for U.S. Appl. No. 16/224,649 dated Aug. 11, 2021.

* cited by examiner

HEARING DEVICE AND METHOD OF UPDATING A HEARING DEVICE

RELATED APPLICATION DATA

This application is a continuation of U.S. patent application Ser. No. 18/317,713 filed on May 15, 2023, pending, which is a continuation of U.S. patent application Ser. No. 17/842,583 filed on Jun. 16, 2022, now issued as U.S. Pat. No. 11,689,870, which is a continuation of U.S. patent application Ser. No. 17/151,454 filed on Jan. 18, 2021, now issued as U.S. Pat. No. 11,395,075, which is a continuation of U.S. patent application Ser. No. 16/224,649 filed on Dec. 18, 2018, now issued as U.S. Pat. No. 11,297,447, which is a continuation of U.S. patent application Ser. No. 15/941,816 filed on Mar. 30, 2018, now issued as U.S. Pat. No. 10,306,379, which is a continuation of U.S. patent application Ser. No. 15/623,266 filed on Jun. 14, 2017, now issued as U.S. Pat. No. 10,057,694, which is a continuation of U.S. patent application Ser. No. 14/799,463, filed on Jul. 14, 2015, now issued as U.S. Pat. No. 10,158,953, which claims priority to and the benefit of Danish Patent Application No. PA 2015 70436 filed on Jul. 2, 2015, and European Patent Application No. 15175140.1 filed on Jul. 2, 2015. The entire disclosures of all of the above applications are expressly incorporated by reference herein.

FIELD

The present disclosure relates to a hearing device and a method of updating a hearing device, in particular a method of updating security settings of a hearing device.

BACKGROUND

Functionalities of a hearing device become increasingly advanced. Wireless communication between a hearing device and external devices, such as hearing device fitting apparatus, tablets, smart phones and remote controllers, has evolved. A wireless communication interface of a hearing device uses an open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

SUMMARY

There is a need for hearing device and method providing improved security for hearing device communication. Further, there is a need for devices and methods reducing the risk of a hearing aid and hearing aid function being compromised by a third party.

Disclosed is a hearing device comprising a processing unit configured to compensate for hearing loss of a user of the hearing device; a memory unit; and an interface. The hearing device is configured to operate according to security settings of the hearing device, the security settings of the hearing device being stored in the memory unit. The processing unit is configured to obtain, e.g. receive from a client device, new security settings via the interface. The new security settings may comprise a new first hearing device key identifier indicative of a hearing device key. The processing unit is configured to verify the new security settings or determine if a verification criterion is fulfilled; and update, if the new security settings are verified or the verification criterion is fulfilled, the security settings of the hearing device based on the new security settings.

Disclosed is also a method of updating a hearing device comprising a processing unit configured to compensate for hearing loss of a user of the hearing device, a memory unit, and an interface, wherein the hearing device is configured to operate according to security settings of the hearing device. The method comprises obtaining new security settings via the interface, the new security settings optionally comprising a new first hearing device key identifier indicative of a hearing device key; verifying the new security settings or determine if a verification criterion is fulfilled; and updating, if the new security settings are verified or a verification criterion is fulfilled, the security settings of the hearing device based on the new security settings.

The method and apparatus as disclosed provides the possibility of remotely controlling which hearing device key(s) a hearing device uses for secure communication with external devices, such as fitting devices and/or client devices.

Further, a hearing device manufacturer may be able to prevent certain device types and/or specific devices to access and/or communicate with the hearing device by appropriate selection of the new security settings, which is advantageous if an external device, such as a fitting device, is e.g. stolen, compromised, or otherwise end up in the wrong hands.

Advantageously, the method and hearing device enable the hearing device manufacturer to control client device access to the hearing device and/or enable version control in client device access to the hearing device. Further, a hearing device manufacturer is able to securely update information about security-related keys or keying material. Also, a hearing device manufacturer is able to securely update information about client device types, client devices and/or signing device identifiers that should not be trusted anymore.

The method and apparatus as disclosed provide scalable security architecture for hearing device systems with improved security. The disclosed hearing device and method support a hearing device in combatting attacks such as unauthorized access or control of a hearing device, while still allowing access to legitimate parties such as a client device, for e.g. fitting purposes, update purposes, maintenance purposes. Further, the need for updating and/or exchange of keys in case a key has been compromised at a client device has been reduced and simplified.

A hearing device includes: a processing unit configured to compensate for hearing loss of a user of the hearing device; a memory unit; and an interface; wherein the hearing device is configured to operate according to one or more security settings of the hearing device, the one or more security settings of the hearing device being stored in the memory unit; and wherein the processing unit is configured to obtain one or more new security settings via the interface, the one or more new security settings comprising a new first hearing device key identifier indicative of a hearing device key, verify the one or more new security settings, and updating the hearing device based on the one or more new security settings if the one or more new security settings are verified.

Optionally, the one or more new security settings comprise a digital signature, and wherein the processing unit is configured to verify the one or more new security settings by verifying the digital signature.

Optionally, the processing unit is configured to verify the one or more new security settings by validating the new first hearing device key identifier.

Optionally, the one or more security settings of the hearing device comprise one or more primary security settings including a hearing device certificate, and wherein the hearing device is configured to verify the one or more new security settings based on the one or more primary security settings of the hearing device.

Optionally, the one or more primary security settings comprise a first hearing device key identifier, and wherein the processing unit is configured to verify the one or more new security settings by determining if the new first hearing device key identifier is valid based on the first hearing device key identifier.

Optionally, the one or more security settings of the hearing device comprise one or more secondary security settings, and wherein the processing unit is configured to verify the one or more new security settings based on the one or more secondary security settings.

Optionally, the one or more new security settings comprise a security update identifier, and wherein the processing unit is configured to verify the one or more new security settings by determining if the security update identifier is valid based on the one or more secondary security settings.

Optionally, the processing unit is configured to update the hearing device by including the new first hearing device key identifier in the one or more secondary security settings.

Optionally, the one or more new security settings comprise one or more client device type revocation identifiers, one or more client device revocation identifiers, one or more signing device revocation identifiers, or any combination of the foregoing.

A method of updating a hearing device comprising a processing unit configured to compensate for hearing loss of a user of the hearing device, a memory unit, and an interface, wherein the hearing device is configured to operate according to one or more security settings of the hearing device, includes: obtaining one or more new security settings via the interface, the one or more new security settings comprising a new first hearing device key identifier indicative of a hearing device key; verifying the one or more new security settings; and updating the hearing device based on the one or more new security settings if the one or more new security settings are verified.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
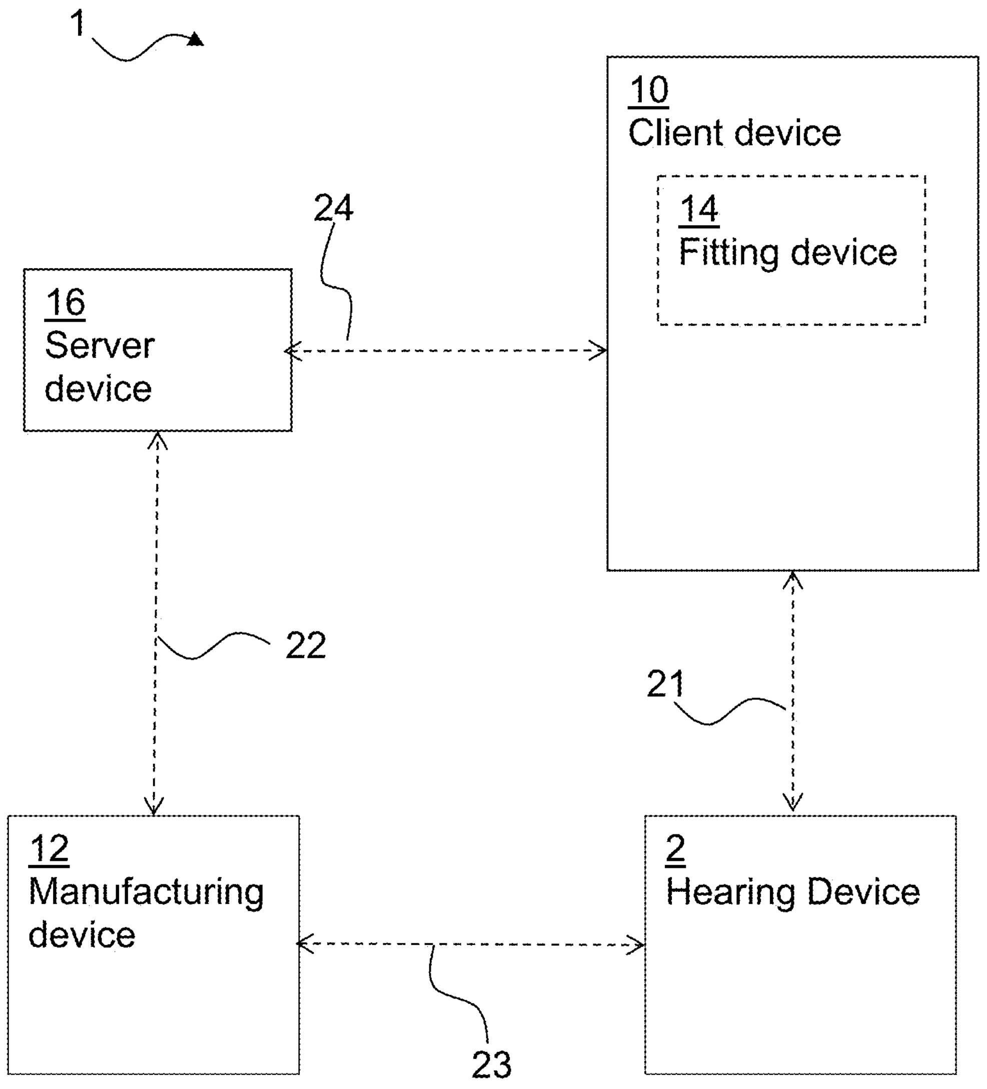
FIG. 1 schematically illustrates an exemplary architecture with a hearing device, FIG. 2 schematically illustrates an exemplary hearing device, FIG. 3 schematically illustrates an exemplary hearing device certificate, FIG. 4 schematically illustrates an exemplary security settings certificate, FIG. 5 schematically illustrates an exemplary security settings certificate, FIG. 6 schematically illustrates an exemplary signalling diagram, FIG. 7 schematically illustrates a flowchart of an exemplary method, FIG. 8 schematically illustrates a flowchart of a part of an exemplary method, and FIG. 9 schematically illustrates a flowchart of a part of an exemplary method.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing device communication. —Namely, the client device disclosed herein enables hearing device communication that is robust against security threats, vulnerabilities and attacks by implementing appropriate safeguards and countermeasures, such as security mechanisms, to protect against threats and attacks. The present disclosure relates to hearing device communication that is robust against replay attacks, unauthorized access, battery exhaustion attacks, and man-in-the-middle attacks.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate comprises a digital signature, so that a recipient of the certificate is able to verify or authenticate the certificate content and origin. The certificate may comprise one or more identifiers and/or keying material, such as one or more cryptographic keys (e.g. a hearing device key) enabling secure communication in a hearing device system. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate. Examples of certificates are X.509 certificates, and Secure/Multipurpose Internet Mail Extensions, S/MIME, certificates, and/or Transport Layer Security, TLS, certificates.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem), the public key is used for encryption and/or signature verification while the private key is used for decryption and/or signature generation. A hearing device key may be keying material allowing derivation of one or more symmetric keys, such as a session key and/or a certificate key for hearing device communication. Hearing device key(s) may be stored in a memory unit of the hearing device, e.g. during manufacture and/or as part of primary security settings/hearing device certificate. A hearing device key may comprise keying material that is used to derive a symmetric key. The hearing device key comprises for example an Advanced Encryption Standard, AES, key, such as an AES-128 bits key.

As used herein the term "identifier" refers to a piece of data that is used for identifying, such as for categorizing and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, etc., such as an array of unsigned integers.

The present disclosure relates to a hearing device. The hearing device comprises a processing unit, a memory unit and an interface. The memory unit may include removable and non-removable data storage units including, but not limited to, Read Only Memory (ROM), Random Access Memory (RAM), etc. The hearing device may comprise a processing unit configured to compensate for hearing loss of a user of the hearing device. The interface may comprise a wireless transceiver, e.g. configured for wireless communication at frequencies in the range from 2.4 to 2.5 GHz. In one or more exemplary hearing devices, the interface is configured for communication, such as wireless communication, with a client device or a hearing device, respectively comprising a wireless transceiver configured to receive and/or transmit data.

The hearing device is configured to operate according to security settings of the hearing device, the security settings of the hearing device being stored in the memory unit. The security settings may comprise primary security settings optionally including a hearing device certificate. The hearing device may be configured to verify the new security settings based on the primary security settings of the hearing device, e.g. based on the hearing device certificate or at least parts thereof.

The hearing device certificate may comprise a hearing device identifier, at least one hearing device key identifier indicative of a hearing device key, and/or one or a plurality of hearing device keys. A hearing device key identifier of the hearing device certificate may be indicative of which hearing device key(s) is/are part of the hearing device certificate. For example, a first hearing device key identifier having the value of "5" indicates that the hearing device certificate includes a first hearing device key with identifier "5", and optionally increments and/or decrements of the identifier, such as hearing device keys with identifiers "6", "7", "8" etc. depending on the number of hearing device keys in the certificate. For example, a hearing device key identifier points to and/or identifies a hearing device key of the hearing device certificate.

The hearing device certificate may comprise a certificate type identifier. The certificate type identifier may indicate a type of the certificate amongst a variety of certificate types, such as a hearing device family certificate type, a hearing device certificate type, a firmware certificate type, a research and development certificate type, client device certificate type. The certificate type identifier may be used by the hearing device to identify what type of certificate the hearing device receives, stores, authenticates and/or retrieves. The hearing device certificate may comprise a version identifier indicative of a data format version of the certificate. The hearing device may use the certificate type identifier and/or the version identifier to determine what type of data the certificate comprises and/or what type of data is comprised in a field of the certificate. For example, the hearing device may determine based on the certificate type identifier and/or version identifier what field of the certificate comprises a digital signature and/or which public key is needed to verify the digital signature of the certificate. It may be envisaged that there is a one-to-one mapping between the certificate type identifier and the public-private key pair.

The hearing device certificate may comprise a signing device identifier. The signing device identifier refers to a unique identifier identifying the device that has signed the hearing device certificate, such as a manufacturing device, e.g. an integrated circuit card, a smart card, a hardware security module. The signing device identifier may for example comprise a medium access control, MAC, address of the signing device and/or a serial number of the signing device. The signing device identifier may allow for example the hearing device to determine whether the signing device is e.g. black-listed or not, and thus to reject certificates signed by a signing device that has been black-listed, e.g. due to theft or other corruption.

The hearing device certificate may comprise one or more hardware identifiers, for example a first hardware identifier and/or a second hardware identifier. A hardware identifier may identify a piece of hardware comprised in the hearing device, such as a radio chip comprised in the hearing device or a digital signal processor of the hearing device. The hardware identifier(s) may be stored in a register of the piece of hardware comprised in the hearing device during manufacturing of the piece of hardware. The hardware identifier may comprise a serial number of the hardware, a chip identifier, or any combination thereof. The hearing device receiving or retrieving from the memory unit the hearing device certificate comprising the hardware identifier may verify the hearing device certificate by comparing its stored hardware identifier and the corresponding hardware identifier comprised in the hearing device certificate. Such verification may be performed upon reception of the hearing device certificate, and/or upon retrieval of the hearing device certificate from the memory unit, such as at boot or power-on of the hearing device.

The security settings of the hearing device may comprise secondary security settings. The secondary security settings may comprise security parameters for the hearing device, for example security parameters that are updated after manufacture, such as updated/current hearing device key identifiers, revocation identifiers, security update identifier. The hearing device may be configured to verify the new security settings based on the secondary security settings of the hearing device. The secondary security settings or at least parts thereof may be set in firmware or set by previously received new security settings/security settings certificates.

The processing unit is configured to obtain new security settings via the interface. The new security settings may comprise a security settings certificate. The new security settings may comprise a new first hearing device key identifier indicative of a (first) hearing device key. The new security settings may comprise one or more, e.g. a plurality of, new hearing device key identifiers indicative of a respective hearing device key. For example, the new security settings may comprise a new second hearing device key identifier indicative of a second hearing device key. The new security settings may comprise a new third hearing device key identifier indicative of a third hearing device key. The new security settings may comprise a new fourth hearing device key identifier indicative of a fourth hearing device key. The new hearing device key identifier(s) may be included in the security settings certificate.

The new security settings, such as the security settings certificate, may comprise a digital signature. To verify the new security settings may comprise to verify the digital signature of the new security settings. The digital signature enables a proof or verification of authenticity of the security settings certificate, such as verification of the signer legitimacy. The digital signature is optionally generated, e.g. by a manufacturing device, using a security settings private key. The digital signature is verifiable by the hearing device using a corresponding security settings public key. If the digital signature is not successfully verified using the alleged public key, the hearing device may disregard the new security setting/security settings certificate and/or abort update of the security settings of the hearing device. For example, the new security settings comprise a digital signature appended to it to protect integrity of the new security settings. Verifying a digital signature comprises e.g. computing a comparison result based on the digital signature and a corresponding security settings public key and comparing the comparison result to the received security settings/security settings certificate. The corresponding security settings public key may be retrieved by the hearing device from the memory unit, a remote data storage unit, and/or the server device. The digital signature may be verified as valid, or the verification is successful when the digital signature raised to the power of the security settings public key is identical to the received new security settings. This may provide the advantage that the hearing device rejects a security settings certificate that is tampered or received from unauthenticated parties. The communication with the hearing device may thus be robust against impersonation, modification and masquerading attacks.

The security settings certificate may comprise a certificate type identifier. The certificate type identifier may indicate a type of the certificate amongst a variety of certificate types, such as a hearing device family certificate type, a hearing device certificate type, a firmware certificate type, a research and development certificate type, client device certificate type and/or a security settings certificate. The certificate type identifier may be used by the hearing device to identify what type of certificate the hearing device receives, stores, authenticates and/or retrieves. The security settings certificate may comprise a version identifier indicative of a data format version of the certificate. The hearing device may use the certificate type identifier and/or the version identifier to determine what type of data the certificate comprises and/or what type of data is comprised in a field of the certificate. For example, the hearing device may determine based on the certificate type identifier and/or version identifier what field of the certificate comprises a digital signature and/or which public key is needed to verify the digital signature of the certificate. It may be envisaged that there is a one-to-one mapping between the certificate type identifier and the public-private key pair.

The security settings certificate may comprise a signing device identifier. The signing device identifier refers to a unique identifier identifying the device that has signed the security settings certificate, such as a manufacturing device, e.g. an integrated circuit card, a smart card, a hardware security module. The signing device identifier may for example comprise a medium access control, MAC, address of the signing device and/or a serial number of the signing device. The signing device identifier may allow for example the hearing device to determine whether the signing device is e.g. black-listed or not, and thus to reject certificates signed by a signing device that has been black-listed, e.g. due to theft or other corruption.

The new security settings may comprise a security update identifier. For example, the security settings certificate may comprise the security update identifier. To verify the new security settings may comprise to determine if the security update identifier is valid based on the secondary security settings, e.g. based on a current security update identifier of the secondary security settings. For example, the secondary security settings may comprise a current security update identifier stored during the last security settings update. The security update identifier may be valid if the security update identifier of the new security settings is indicative of a more recent security update, e.g. if the security update identifier of the new security settings is larger than the current security update identifier stored in the secondary security settings. The security update identifier may be indicative of the order of security settings updates and/or the number of security updates. The security update identifier enables the hearing device to verify that the new security settings are the latest available security settings or at least later than the current security settings. Thus, a security update with outdated security settings can be prevented.

The new security settings may comprise a client device type revocation identifier and/or a list of client device type revocation identifiers. For example, the security settings certificate may comprise the client device type revocation identifier and/or the list of client device type revocation identifiers. A client device type revocation identifier is indicative of a client device type that is not allowed to communicate with the hearing device. By including one or more client device type revocation identifiers in the new security settings, a manufacturer or sender of the security settings certificate is able to black-list a client device type or group of client devices. Thus, the hearing device manufacturer is able to prevent one or more client device types to communicate with the hearing device.

The new security settings may comprise a client device revocation identifier and/or a list of client device revocation identifiers. For example, the security settings certificate may comprise the client device revocation identifier and/or the list of client device revocation identifiers. A client device revocation identifier is indicative of a client device that is not allowed to communicate with the hearing device. By including one or more client device revocation identifiers in the new security settings, a manufacturer or sender of the security settings certificate is able to black-list a specific client device. Thus, the hearing device manufacturer is able to prevent one or more specific client devices to communicate with the hearing device.

The new security settings may comprise a signing device revocation identifier and/or a list of signing device revocation identifiers. For example, the security settings certificate may comprise the signing device revocation identifier and/or the list of signing device revocation identifiers. A signing device revocation identifier is indicative of a signing device that is not allowed to sign certificates for the hearing device. By including one or more signing device revocation identifiers in the new security settings, a manufacturer or sender of the security settings certificate is able to black-list a specific signing device. Thus, the hearing device manufacturer is able to prevent the use of a black-listed signing device for attacking the hearing device.

The hearing device is configured to operate according to security settings of the hearing device. The security settings of the hearing device may comprise primary security settings including a hearing device certificate. The primary security settings, e.g. the hearing device certificate, may be stored in a read-only part of the memory unit. The hearing device may be configured to verify the new security settings based on the primary security settings, such as the hearing device certificate, of the hearing device. The primary security settings, such as the hearing device certificate, may comprise one or more hearing device key identifiers and/or one or more hearing device keys. The primary security settings, such as the hearing device certificate, may comprise a first hearing device key identifier.

The processing unit is configured to verify the new security settings or determine if a verification criterion is fulfilled. To verify the new security settings may comprise verifying one or more identifiers of the new security settings and/or the security settings certificate. The new security settings may then be verified or at least partly verified if the evaluated identifier(s) is/are valid.

To verify the new security settings may comprise to validate one or more new hearing device key identifiers, e.g. including the new first hearing device key identifier, of the new security settings/security settings certificate. The new security settings may then be verified or at least partly verified if one of, some of or all the one or more new hearing device key identifiers are valid. To verify the new security settings may comprise to determine if the new first hearing device key identifier is valid based on the first hearing device key identifier of the primary security settings/hearing device certificate. In one or more exemplary hearing devices, the new first hearing device key identifier is not valid if the new first hearing device key identifier is smaller than the first hearing device key identifier of the hearing device certificate. In one or more exemplary hearing devices, the new first hearing device key identifier is not valid if the new first hearing device key identifier is smaller than a current first hearing device key identifier of the secondary security settings. In one or more exemplary hearing devices, the new first hearing device key identifier is valid if the new first hearing device key identifier is larger than or equal to the first hearing device key identifier of the hearing device certificate. In one or more exemplary hearing devices, the new first hearing device key identifier is valid if the new first hearing device key identifier is larger than or equal to a current first hearing device key identifier of the secondary security settings.

To verify the new security settings/security settings certificate may comprise to verify the certificate type identifier of the new security settings/security settings certificate, e.g. to verify that the hearing device/hearing device firmware supports the received security settings certificate.

To verify the new security settings/security settings certificate may comprise to verify that the signing device identifier of the security settings certificate is not blacklisted, e.g. identified on list with current signing device revocation identifier(s) of secondary security settings.

To verify the new security settings/security settings certificate may comprise to verify that the version identifier of the new security settings/security settings certificate is valid. In one or more exemplary hearing devices, the version identifier of the new security settings is valid if the version identifier is supported by firmware of the hearing device.

The new security settings may comprise a plurality of new hearing device key identifiers and to verify the new security settings may comprise to validate the plurality of new hearing device key identifiers, and wherein the new security settings are verified if the plurality of new hearing device key identifiers is valid.

The processing unit is configured to update, if the new security settings are verified or the verification criterion is fulfilled, the security settings of the hearing device. To update the security settings of the hearing device may comprise to include/store the new security settings or at least parts thereof as security settings of the hearing device, such as the secondary security settings.

To update the security settings of the hearing device may comprise to include/store the new first hearing device key identifier and/or a plurality of new hearing device key identifiers in security settings of the hearing device, such as the secondary security settings. The new first hearing device key identifier may be stored as current first hearing device key identifier of the secondary security settings, e.g. by over-writing a previously stored current first hearing device key identifier. To update the security settings of the hearing device may comprise to determine a future first hearing device key identifier based on the new first hearing device key identifier and/or the first hearing device key identifier of the hearing device certificate, and to store the future first hearing device key identifier as current first hearing device key identifier in the secondary security settings. To update the security settings of the hearing device may comprise to determine a future first hearing device key identifier based on a current first hearing device key identifier of the secondary security settings. In one or more exemplary hearing devices a future first hearing device key identifier is determined by setting the future first hearing device key identifier to the current first hearing device key identifier of the secondary security settings (i.e. no update), if the new first hearing device key identifier has a default value, e.g. zero. In one or more exemplary hearing devices a future first hearing device key identifier is determined by setting the future first hearing device key identifier to the new first hearing device key identifier, if the new first hearing device key identifier is larger than or equal to the current first hearing device key identifier and is indicative of a first hearing device key of the security settings. In one or more exemplary hearing devices, a future first hearing device key identifier is determined by setting the future first hearing device key identifier to correspond to a hearing device key identifier indicative of the last first hearing device key of the security settings, if the new first hearing device key identifier is larger than or equal to the first hearing device key identifier of the primary security settings and is indicative of a first hearing device key not present in the primary security settings. The above examples of to update current first hearing device key identifier of secondary security settings may also apply to update of current second, third and/or fourth hearing device key identifier of the secondary security settings.

To update the security settings of the hearing device may comprise to store the security update identifier of the new security settings. The security update identifier of the new security settings may be stored as current security update identifier of the secondary security settings, e.g. by over-writing a previously stored current security update identifier.

To update the security settings of the hearing device may comprise to update a client device type revocation identifier and/or a list of client device type revocation identifiers of the security settings, e.g. by storing client device type identifier (s) of the new security settings/security settings certificate in security settings of the hearing device, such as the secondary security settings. To update the security settings of the hearing device may comprise to delete previously stored client device type revocation identifier(s) from the secondary security settings.

To update the security settings of the hearing device may comprise to update a client device revocation identifier and/or a list of client device revocation identifiers of the security settings, e.g. by storing client device revocation identifier(s) of the new security settings/security settings certificate in security settings of the hearing device, such as the secondary security settings. To update the security settings of the hearing device may comprise to delete previously stored client device revocation identifier(s) from the secondary security settings.

To update the security settings of the hearing device may comprise to update a signing device revocation identifier and/or a list of signing device revocation identifiers of the security settings, e.g. by storing signing device revocation identifier(s) of the new security settings/security settings certificate in security settings of the hearing device, such as the secondary security settings. To update the security settings of the hearing device may comprise to delete previously stored signing device revocation identifier(s) from the secondary security settings. Deletion of previously stored identifiers provides efficient use of the limited memory capacity of a hearing device.

In the method, verifying the new security settings may comprise verifying the digital signature of the new security settings/security settings certificate. Verifying the new security settings may comprise validating the new first hearing device key identifier, and wherein the new security settings are verified or at least partly verified if the new first hearing device key identifier is valid.

In the method, the security settings of the hearing device may comprise primary security settings including a hearing device certificate. Verifying the new security settings may be based on the primary security settings of the hearing device. The primary security settings may comprise a first hearing device key identifier, and verifying the new security settings may comprise determining if the new first hearing device key identifier is valid based on the first hearing device key identifier of the primary security settings.

In the method, the security settings of the hearing device may comprise secondary security settings, and verifying the new security settings may be based on the secondary security settings of the hearing device. In one or more exemplary methods, the new first hearing device key identifier is valid if the new first hearing device key identifier is larger than or equal to the first hearing device key identifier of the hearing device certificate and larger than or equal to a current first hearing device key identifier of the secondary security settings.

In the method, the new security settings may comprise a security update identifier, and verifying the new security settings may comprise determining if the security update identifier is valid based on the secondary security settings, such as a current security update identifier of the secondary security settings.

In the method, updating the security settings of the hearing device may comprises including the new first hearing device key identifier in the secondary security settings.

In the method, the new security settings may comprise one or more client device type revocation identifiers and/or one or more client device revocation identifiers, and/or one or more signing device revocation identifiers. Updating the security settings of the hearing device may comprise updating one or more client device type revocation identifiers and/or one or more client device revocation identifiers, and/or one or more signing device revocation identifiers, e.g. in secondary security settings of the hearing device.

FIG. 1 schematically illustrates exemplary devices that may be used for manufacturing, maintenance/update of, and/or operating a hearing device 2. FIG. 1 shows an exemplary system 1 and a hearing device 2. The system 1 may comprise one or more of a manufacturing device 12, a client device 10, and a server device 16 for manufacturing, maintenance/update of, and/or operating the hearing device 2 optionally including but not limited to updating security settings of the hearing device. The manufacturing device 12 may be configured to transmit/install a hearing device certificate in the hearing device. The hearing device 2 may be configured to compensate for hearing loss of a user of the hearing device 2. The hearing device 2 may be configured to communicate with the manufacturing device 12 using e.g. a communication link 23, such as a uni or bi-directional communication link. The communication link 23 may be a wired link and/or wireless communication link. The communication link 23 may be a single hop communication link or a multi-hop communication link. The wireless communication link may be carried over a short-range communication system, such as Bluetooth, Bluetooth low energy, IEEE 802.11, Zigbee. The hearing device 2 may be configured to receive a hearing device certificate from the manufacturing device 12 and to store the hearing device certificate in a memory unit comprised in the hearing device 2, e.g. as part of primary security settings. Alternatively or additionally, the manufacturing device 12 may store the hearing device certificate directly in the memory unit of the hearing device. For example, the manufacturing device 12 may write the hearing device certificate in the memory unit. For example, during manufacturing of the hearing device 2, the manufacturing device 12 connects to the hearing device 2 and transmits the hearing device certificate to the hearing device 2. The hearing device may receive and store the hearing device certificate. The hearing device 2 may then use the material provided in the hearing device certificate to secure communications with client devices when needed, i.e. the hearing device certificate may form part of security settings, such as primary security settings of the hearing device. The hearing device 2 may be configured to connect to the client device 10 via a communication link 21, such as a bidirectional communication link. The communication link 21 may be a wired link and/or wireless communication link. The communication link 21 may be a single hop communication link or a multi hop communication link. The wireless communication link may be carried over a short-range communication system, such as Bluetooth, Bluetooth low energy, IEEE 802.11, Zigbee. The hearing device 2 may configured to connect to the client device 10 over a network. The client device 10 may permit remote fitting of the hearing aid device where a dispenser connects to the hearing device via the client device 10 of the user. The client device 10 may comprise a computing device acting as a client, such as a fitting device 14 (e.g. a handheld device, a relay, a tablet, a personal computer, a mobile phone, and/or USB dongle plugged in a personal computer). The client device 10 may be configured to communicate with the server device 16 via a communication link 24, such as a bidirectional communication link. The communication link 24 may be a wired link and/or wireless communication link. The communication link 24 may comprise a network, such as the Internet. The client device 10 may be configured to communicate with the server device 16 for maintenance, and update purposes. The server device 16 may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
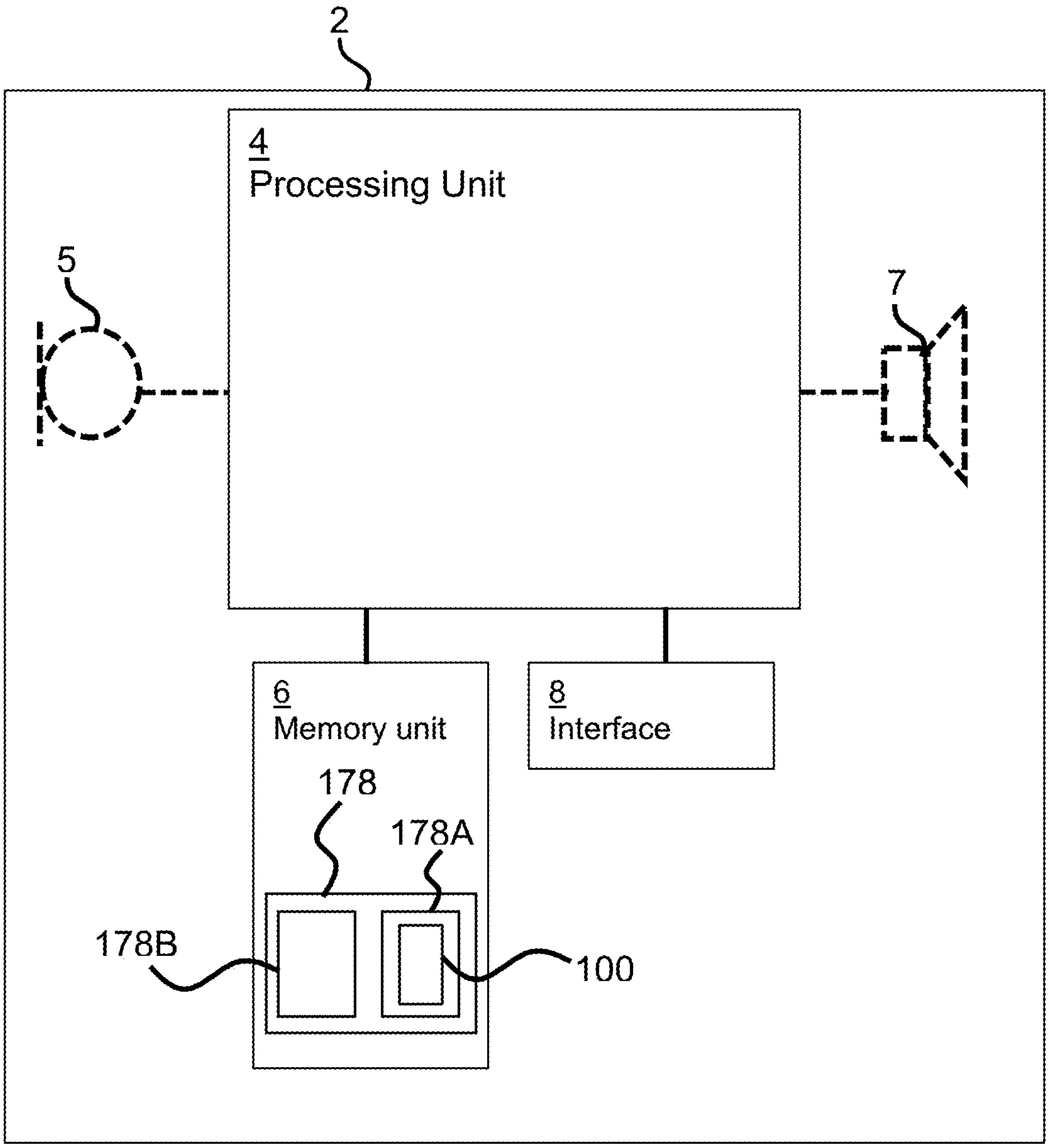

FIG. 2 schematically illustrates an exemplary hearing device 2. The hearing device 2 comprises a processing unit 4, a memory unit 6 and an interface 8. The hearing device 2 comprises a processing unit 4 configured to compensate for hearing loss of a user of the hearing device 2. The interface 8 optionally comprises a wireless transceiver, e.g. configured for wireless communication at frequencies in the range from 2.4 to 2.5 GHz. The interface 8 is configured for communication, such as wired and/or wireless communication, with a manufacturing device 12 and/or a client device 10. The processing unit 4 may be configured to compensate for hearing loss of a user of the hearing aid according to data received during manufacture. The hearing device 2 optionally comprises a microphone 5 or a plurality of microphones for receiving sound signal(s) and converting sound signal(s) into converted sound signal(s). In one or more exemplary hearing devices, a wireless transceiver of the interface may also provide one or more converted sound signal(s), e.g. from an external sound source such as a mobile phone or sound system with wireless transmitter. The converted sound signal(s) may be an electrical and/or digital version of the sound signal. The processing unit 4 is configured to receive and process the converted sound signal(s) into a processed sound signal according to a hearing loss of a user of the hearing device 2. The processed sound signal may be compressed and/or amplified or the like. The hearing device 2 comprises an output transducer/loudspeaker 7, known as a receiver. The receiver 7 is configured to receive the processed sound signal and convert the processed sound signal to an output sound signal for reception by an eardrum of the user. The hearing device is configured to operate according to security settings 178 of the hearing device. The security settings 178 comprises primary security settings 178A comprising hearing device certificate 100. Optionally, the security settings 178 comprises secondary security settings 178B. The memory unit 6 may include removable and non-removable data storage units including, but not limited to, Read Only Memory (ROM), Random Access Memory (RAM), etc.

Figure 3:
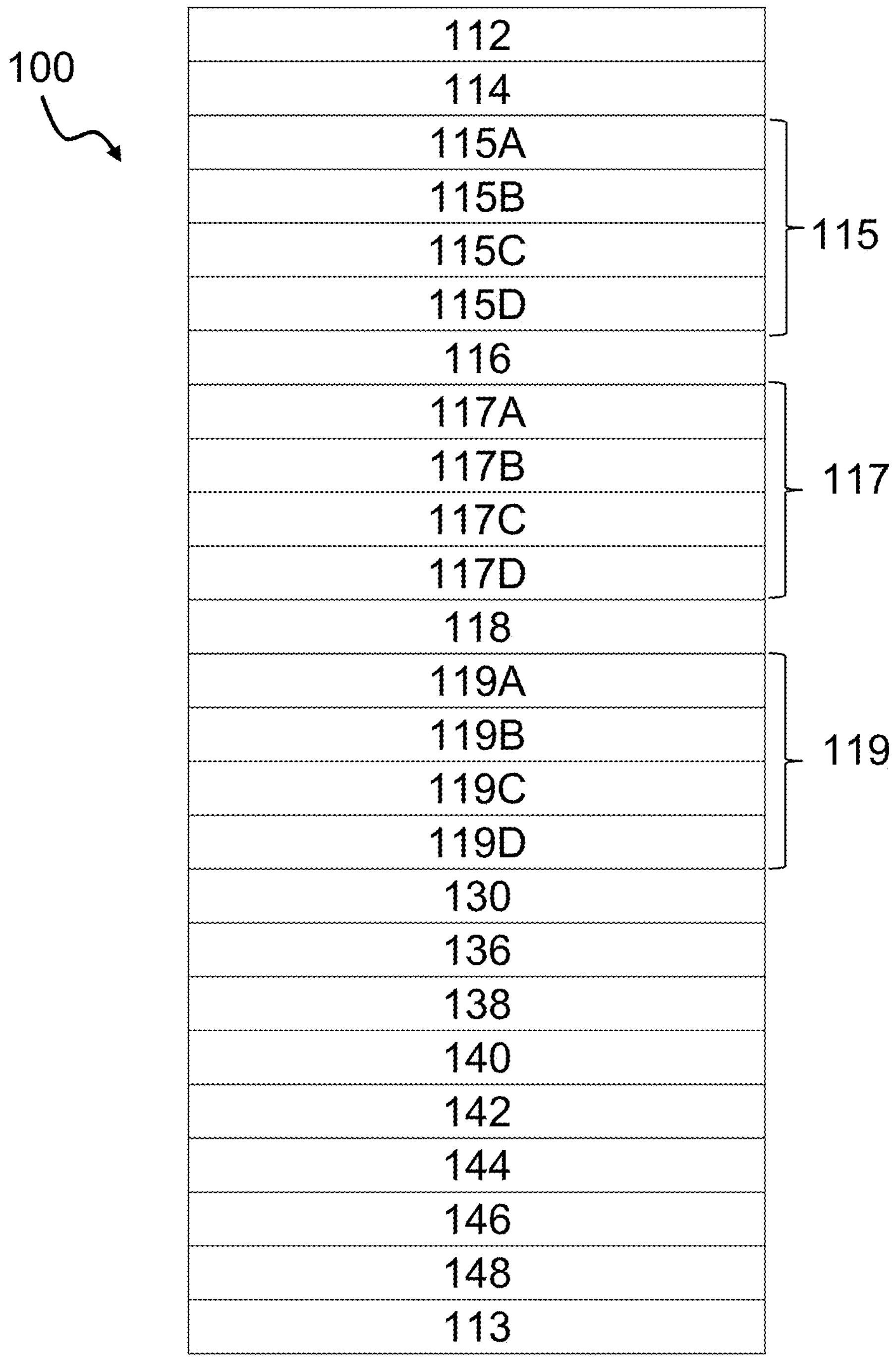

FIG. 3 schematically illustrates an exemplary hearing device certificate 100, e.g. forming part of primary security settings of the hearing device. The hearing device certificate 100 comprises a hearing device identifier 112, at least one hearing device key identifier including a first hearing device key identifier 114 indicative of a hearing device key and one or a plurality of hearing device keys. The hearing device identifier 112 may refer to a unique or a pseudo-unique identifier. The first hearing device key identifier 114 is indicative of the first hearing device key(s) of the hearing device certificate. For example, the first hearing device key identifier 114 may be indicative of or point to a hearing device key of a first set 115 of hearing device keys (115A, 115B, 115C, 115D) of the hearing device certificate, e.g. the first primary hearing device key 115A. The hearing device certificate 100 optionally comprises two, three, four or more sets of hearing device keys enabling secure communication with different client devices/client device types. The hearing device certificate 100 comprises a first set 115 of hearing device keys including a first primary hearing device key 115A. The at least one hearing device key identifier comprises a first hearing device key identifier 114 indicative of a hearing device key of the first set 115 of hearing device keys 115A, 115B, 115C, 115D. The first set 115 of hearing device keys comprises for example first primary key 115A, first secondary key 115B, first tertiary key 115C, and first quaternary key 115D dedicated to securing communication to and from a first client device or a first client device type. For example, the first set 115 of hearing devices key may be a set of hearing device keys 115A, 115B, 115C, 115D for securing communication of hearing device data with the first client device.

The plurality of hearing device keys may comprise a second set 117 of hearing device keys including a second primary hearing device key 117A, a second secondary hearing device key 117B, a second tertiary hearing device key 117C, and/or a second quaternary hearing device key 117D. The at least one hearing device key identifier comprises a second hearing device key identifier 116 indicative of a hearing device key of the second set 117 of hearing device keys 117A, 117B, 117C, 117D. The hearing device is configured to communicate with one or more client devices, such as a first client device and/or a second client device. For each client device or client device type that the hearing device is configured to communicate with, the hearing device certificate optionally comprises a set of hearing device keys configured to enable secure communication with a specific client device or client device type. The hearing device certificate may comprise a third set 119 of hearing device keys including a third primary hearing device key 119A, a third secondary hearing device key 119B, a third tertiary hearing device key 119C, and/or a third quaternary hearing device key 119D. The at least one hearing device key identifier comprises a third hearing device key identifier 118 indicative of a hearing device key of the third set 119 of hearing device keys. The hearing device certificate 100 may comprise a fourth set of hearing device keys including a fourth primary hearing device key (not shown). The at least one hearing device key identifier comprises a fourth hearing device key identifier indicative of a hearing device key of the fourth set of hearing device keys. The hearing device 2 may be configured to select a set of hearing device keys based on the client device or the client device type connected to the hearing device and to select a hearing device key from the set of hearing device keys selected based on the hearing device key identifier associated with the selected set of hearing devices.

The hearing device certificate 100 comprises a certificate type identifier 130. The certificate type identifier 130 indicates that the hearing device certificate 100 is a hearing device certificate, e.g. selected amongst a variety of certificate types, such as a hearing device family certificate type, a hearing device certificate type, a firmware certificate type, a research and development certificate type, and a client device certificate type. The certificate type identifier 130 may be used to enable the hearing device 2 to identify what type of certificate it receives, stores, authenticates and/or retrieves. The hearing device certificate 100 may comprise a version identifier which indicates a data format version of the hearing device certificate. The hearing device 2 may use the certificate type identifier 130 and/or the version identifier to determine what type of data the hearing device certificate 100 comprises, what type of data is comprised in a field of the hearing device certificate 100. For example, the hearing device 2 may determine based on the certificate type identifier 130 and/or version identifier what field of the certificate comprises a digital signature 113, and which public key is needed to verify the digital signature 113. It may be envisaged that there is a one-to-one mapping between the certificate type identifier 130 and the public-private key pair used for generating the digital signature 113. The hearing device certificate 100 may comprise a length identifier that indicates the length of the hearing device certificate 100, e.g. in bits, bytes.

The hearing device certificate 100 optionally comprises a signing device identifier 136. The signing device identifier 136 refers to a unique identifier identifying the device (such as a manufacturing device 12, e.g. an integrated circuit card, a smart card, a hardware security module comprised in a manufacturing device 12) that has signed the hearing device certificate 100. The signing device identifier 136 may for example comprise a medium access control, MAC, address of the signing device, a serial number. The signing device identifier 136 allows for example the hearing device 2 to determine whether the signing device is e.g. black-listed or not, and thus to reject hearing device certificates 100 signed by a signing device that is black-listed.

The hearing device certificate 100 optionally comprises one or more hardware identifiers including a first hardware identifier 148 and/or a second hardware identifier (not shown). The hardware identifier 148 may identify a piece of hardware comprised in the hearing device 2, such as a processing unit 4, a radio chip comprised in the hearing device 2, a digital signal processor of the hearing device 2. The first hardware identifier 148 may also be stored in a register of the piece of hardware comprised in the hearing device 2 during manufacturing of the piece of hardware. The first hardware identifier 148 may comprise a serial number, a medium access control, MAC, address, a chip identifier, or any combination thereof. The hearing device certificate 100 may comprise a first hardware identifier 148, a second hardware identifier and/or a third hardware identifier. For example, the first hardware identifier 148 may provide a first hearing device specific value present in a register of a hardware module (e.g. the processing unit or the radio chip) of the hearing device 2 while the second hardware identifier may provide a second hearing device specific value present in a register of a hardware module of the hearing device 2, and a third hardware identifier may provide a third hardware module identifier (e.g. a processing unit identifier, a DSP identifier). The hearing device 2 may, e.g. at start-up, verify the hearing device certificate 100 by comparing its stored hardware identifier and the first hardware identifier 148 comprised in the hearing device certificate 100 received. This way, the hearing device 2 may determine if the hearing device certificate stored in the hearing device is intended for the hearing device 2 and reject the received hearing device certificate if the hardware identifiers of the hearing device certificate do not match the hardware module register values of hearing device hardware.

The hearing device certificate 100 optionally comprises a client device type authorization identifier 144. A client device type may comprise a model, category or type of client devices, such as a tablet product model, category or type, a USB dongle product model, category or type. The client device type authorization identifier 144 is an identifier of an authorized client device type, such as an identifier of the client device types that the hearing device 2 may authorize for communication, such as for fitting, maintenance and/or operation. The client device type authorization identifier 144 is for example a bit-field indicating the type of client device the hearing device 2 should allow for fitting.

The hearing device certificate 100 optionally comprises one or more of a hardware platform identifier 138, a software platform identifier 140, and/or a certificate timestamp 142. The hardware platform identifier 138 may identify a hardware platform, such as an operational hearing device hardware platform, i.e. a hardware platform on which the hearing device certificate may be used. The software platform identifier 140 may identify a family of software platforms on which the hearing device certificate is configured to operate. The certificate timestamp 142 refers to a timestamp of production or manufacture of the hearing device certificate 100, such as a timestamp of the manufacturing device 12 indicating a time instant when the hearing device certificate 100 is generated. The certificate timestamp 142 may be in form of e.g.: hour, min, date, month, year.

The hearing device certificate 100 comprises a digital signature 113 and/or a MAC. The digital signature 113 enables a proof or verification of authenticity and/or content of the hearing device certificate 100, such as verification of the signer legitimacy (e.g. whether the signer is a legitimate manufacturing device). The digital signature 113 is generated by the manufacturing device 12 using a device family private key during manufacturing of the hearing device.

Figure 4:
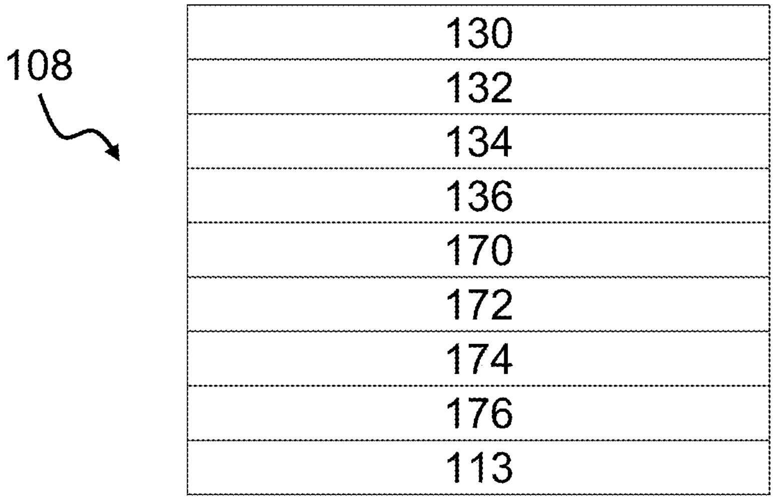

FIG. 4 schematically illustrates an exemplary security settings certificate 108. The security settings certificate 108 comprises a digital signature 113 and/or a MAC. The digital signature 113 enables a proof or verification of authenticity and/or content of the security settings certificate 108, such as verification of the signer legitimacy (e.g. whether the signer is a legitimate manufacturing device). The digital signature 113 is generated by a signing device using a security settings private key.

The security settings certificate 108 comprises a certificate type identifier 130. The certificate type identifier 130 indicates that the security settings certificate 108 is a security settings certificate, e.g. selected amongst a variety of certificate types, such as a hearing device family certificate type, a hearing device certificate type, a firmware certificate type, a research and development certificate type, a security settings certificate, and a client device certificate type. The certificate type identifier 130 may be used to enable the hearing device 2 to identify what type of certificate it receives, stores, authenticates and/or retrieves. The security settings certificate 108 may comprise a version identifier 132 indicative of data format version of the security settings certificate 108. The hearing device 2 may use the certificate type identifier 130 and/or the version identifier 132 to determine what type of data the security settings certificate 108 comprises, what type of data is comprised in a field of the hearing device certificate 100. The security settings certificate 108 may comprise a length identifier 134 that indicates the length of the security settings certificate 108, e.g. in bits, bytes. For example, the hearing device 2 may determine based on the certificate type identifier 130, the version identifier 132 and/or the length identifier 134 what field of the certificate 108 comprises digital signature 113, and which public key is needed to verify the digital signature 113. It may be envisaged that there is a one-to-one mapping between the certificate type identifier 130 and the public-private key pair used for generating the digital signature 113.

The security settings certificate 108 optionally comprises a signing device identifier 136. The signing device identifier 136 refers to a unique identifier identifying the device (such as a manufacturing device 12, e.g. an integrated circuit card, a smart card, a hardware security module comprised in a manufacturing device 12) that has signed the security settings certificate 108. The signing device identifier 136 may for example comprise a medium access control, MAC, address of the signing device, a serial number. The signing device identifier 136 allows for example the hearing device 2 to determine whether the signing device is e.g. black-listed or not, and thus to reject a security settings certificate 108 signed by a signing device that has been black-listed, e.g. based on signing device revocation identifier(s) of secondary security settings.

The security settings certificate 108 comprises a security update identifier 170. The security update identifier 170 allows for example the hearing device 2 to ensure that current security settings for the hearing device are not updated/replaced by outdated or old security settings. The security settings certificate 108 comprises one or more of a client device type revocation identifier 172, a client device revocation identifier 174 and/or a signing device revocation identifier 176. Thereby, the hearing device is able to black-list or revoke a client device type (i.e. a group of client devices), a specific client device and/or a signing device.

Figure 5:
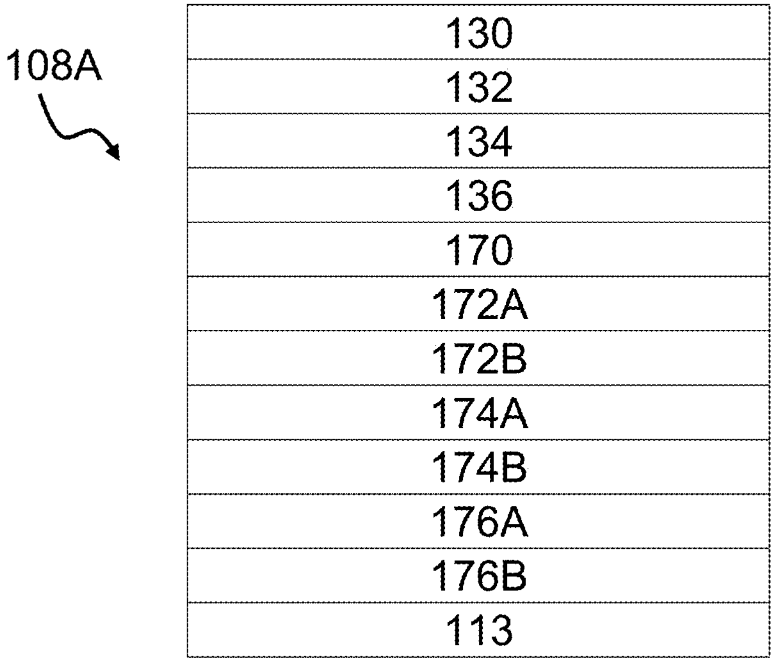

FIG. 5 schematically illustrates an exemplary security settings certificate 108A enabling black-listing or revocation of a plurality of client device types, client device and/or signing devices with a single security update. The security settings certificate 108A comprises a list or array of client device type revocation identifiers 172B and field with a number of client device type revocation identifiers 172A. The security settings certificate 108A comprises a list or array of client device revocation identifiers 174B and field with a number of client device revocation identifiers 174A. The security settings certificate 108A comprises a list or array of signing device revocation identifiers 176B and field with a number of signing device revocation identifiers 176A. Lists with client device type revocation identifier(s), client device revocation identifier(s) and/or signing device revocation identifier(s) may reduce the number of security updates. Further, a hearing device may be configured to delete previously stored revocation identifiers at security settings update. Further, a hearing device manufacturer does not have to rely on that previously sent security settings have been received and updated in the hearing device.

Figure 6:
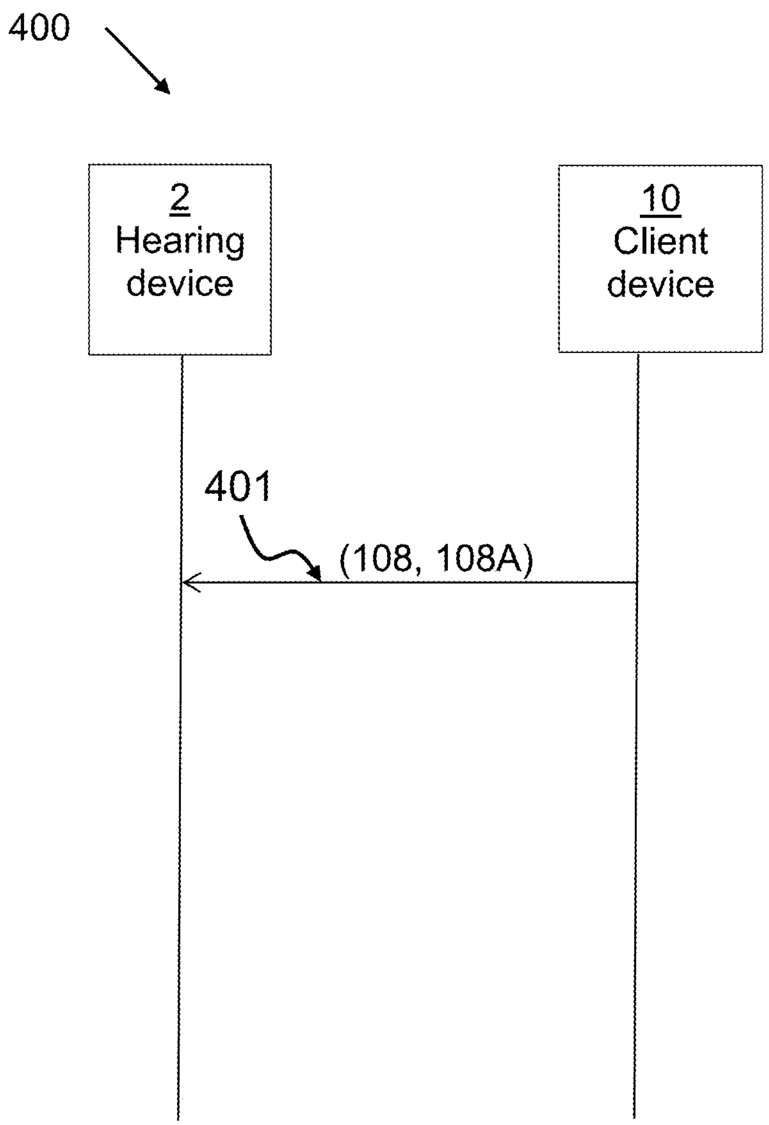

FIG. 6 shows an exemplary signalling diagram for updating security settings of a hearing device, such as hearing device 2. The hearing device 2 is configured to operate according to security settings of the hearing device, the security settings of the hearing device being stored in the memory unit. The hearing device comprises a processing unit configured to obtain new security settings 401 via an interface of the hearing device 2, e.g. as illustrated by receiving new security settings 401 from a client device 10. The new security settings 401 comprise a security settings certificate 108 or security certificate 108A. Upon receipt of the new security settings, the processing unit is configured to verify the new security settings. In one or more exemplary hearing devices, to verify the new security settings at least comprises to determine if the security update identifier 170 is valid and to verify the digital signature 113. Thus a number of sub-verifications may be performed to verify the new security settings. In one or more exemplary hearing devices, to verify the new security settings comprises to verify the certificate type identifier 130, to verify that the version identifier 132 is valid, to verify that the signing device identifier 136 of the security settings certificate is not black-listed, to verify/determine if the security update identifier 170 is valid and to verify the digital signature 113. If the new security settings are verified (verification criterion fulfilled), the processing unit of hearing device 2 is configured to update the security settings of the hearing device based on the new security settings.

Figure 7:
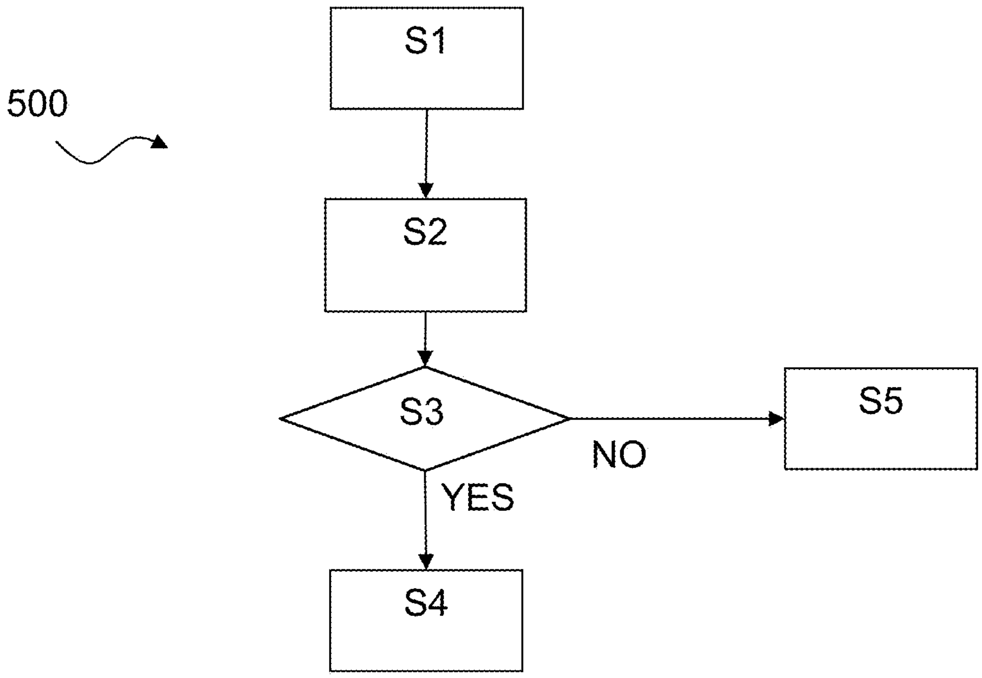

FIG. 7 is a flow diagram of an exemplary method of updating a hearing device comprising a processing unit configured to compensate for hearing loss of a user of the hearing device, a memory unit, and an interface, wherein the hearing device is configured to operate according to security settings of the hearing device. The method 500 comprises obtaining S1, e.g. receiving from a client device, new security settings via the interface and verifying S2 the new security settings. If the new security settings are verified S3, the method proceeds to updating S4 the security settings of the hearing device based on the new security settings. If the new security settings are not verified, the method proceeds to disregarding S5 the new security settings.

Figure 8:
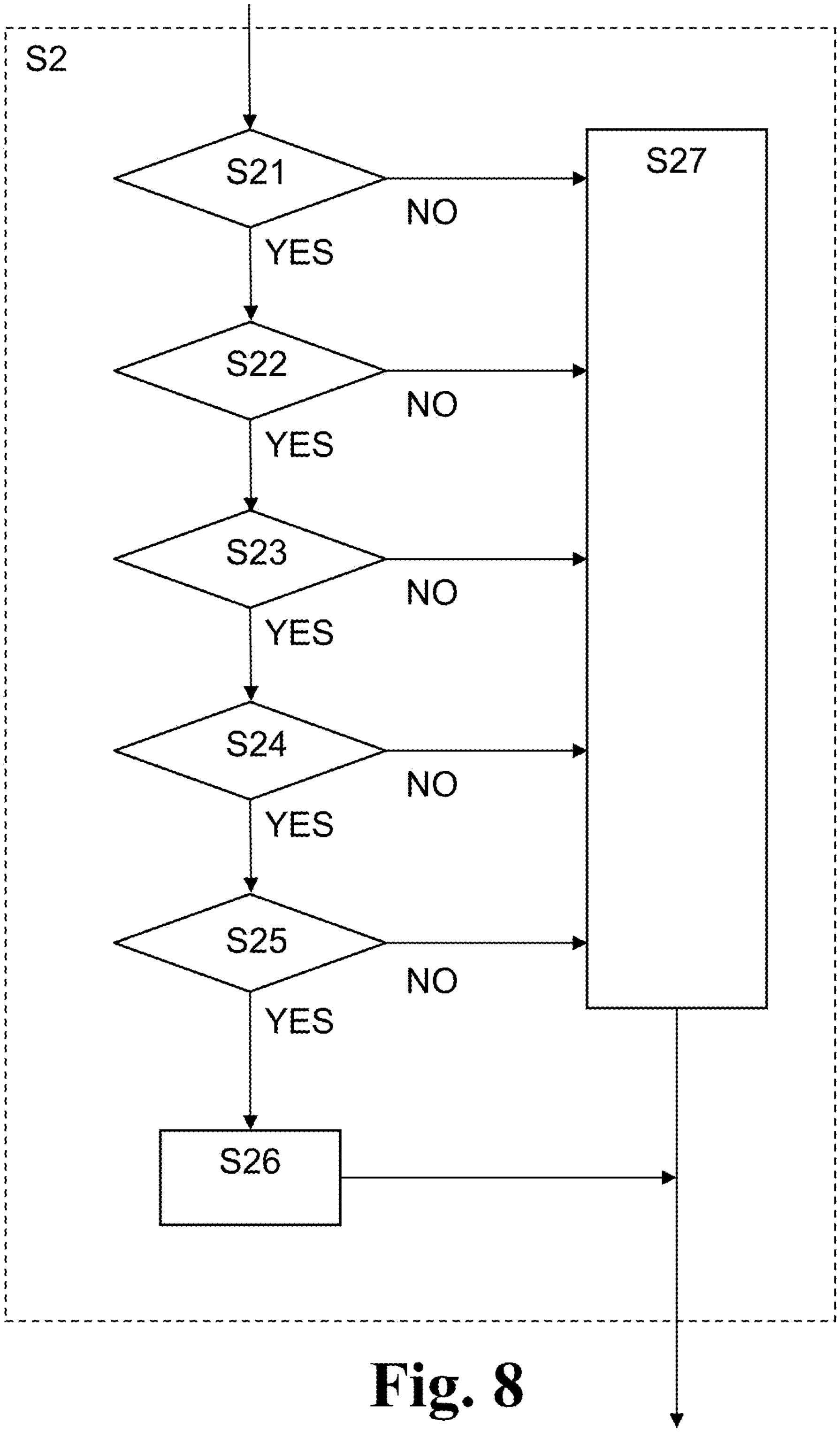

FIG. 8 is a flow diagram showing an example of verifying S2 the new security settings. Verifying S2 the new security settings comprises verifying S21 certificate type identifier of the new security settings. If the certificate type identifier is verified, verifying S2 optionally comprises verifying S22 version identifier of the new security settings, e.g. determine if the version identifier is supported by the firmware of the hearing device. If the version identifier is verified, verifying S2 comprises verifying S23 security update identifier of the new security settings, e.g. to determine if the security update identifier is valid based on a current security update identifier of the secondary security settings, for example if the security update identifier of the new security settings is larger than the current security update identifier of the secondary security settings. If the security update identifier is verified, verifying S2 comprises verifying S24 signing device identifier of the new security settings, e.g. it is verified that the signing device identifier is not black-listed, i.e. corresponds to a signing device revocation identifier of secondary security settings of the hearing device. If the signing device identifier is verified, verifying S2 comprises verifying S25 digital signature of new security settings, e.g. using a security settings public key. If the digital signature is verified, the new security settings are verified S26. If any of the acts of verifying S21, S22, S23, S24, S25 results in non-verification, the new security settings are not verified S27. In one or more exemplary methods, S21 and/or S22 are omitted. The order of verifying S21, S22, S23, S24, S25 may be changed.

Figure 9:
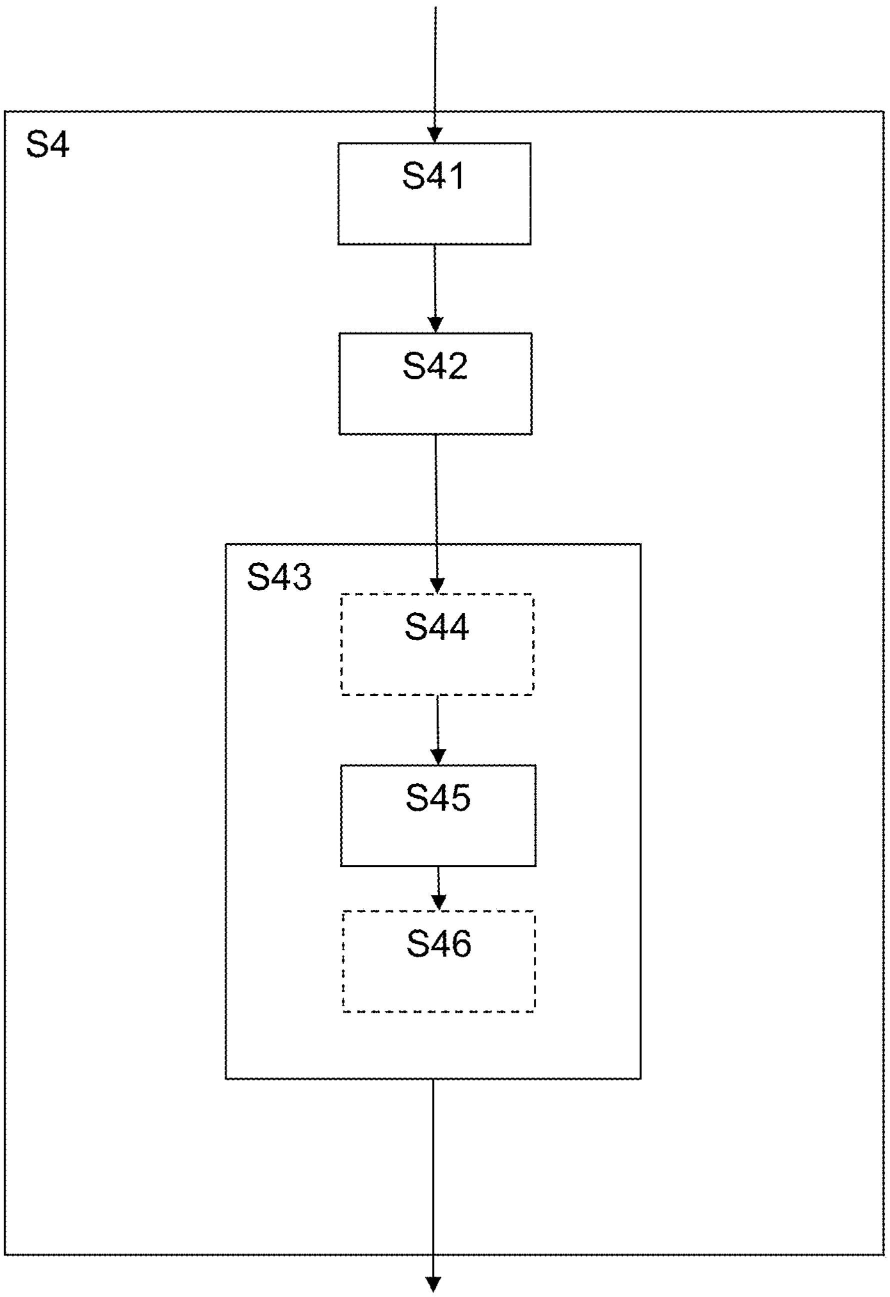

FIG. 9 is a flow diagram showing an example of updating S4 the security settings of the hearing device based on the new security settings. Updating S4 the security settings of the hearing device comprises determining S41 future hearing device key identifier(s) based on new first hearing device key identifier(s) of the new security settings, hearing device key identifier(s) of the primary security settings/hearing device certificate and/or current hearing device key identifier(s) of secondary security settings of the hearing device. Updating S4 the security settings of the hearing device comprises storing S42 the future hearing device key identifier(s) as current hearing device key identifier(s) in the memory unit of the hearing device. Updating S4 the security settings of the hearing device may comprise updating S43 revocation identifier(s) of the new security settings. Optionally, the method comprises selecting S44 which revocation identifier(s) or list of revocation identifiers are to be updated, e.g. based on the new security settings. For example, if a field 172A, 174A, 176A indicative of the number of revocation identifiers is set to a default value, e.g. zero, no update of the respective revocation identifier or list of revocation identifiers should be updated. Updating S43 revocation identifier(s) of the new security settings comprises storing S45 the revocation identifiers of the new security settings or the selected revocation identifiers in the secondary security settings of the memory unit. In an exemplary method, updating S43 revocation identifier(s) of the new security settings optionally comprises deleting S46 previously stored revocation identifier(s).

It is to be noted that the use of the terms "first", "second", "primary", "secondary", "tertiary", "quaternary" and the like does not imply any particular order, but they are included to identify individual elements. Moreover, the use of the terms first, second, etc. does not denote any order or importance, but rather the terms first, second, etc. are used to distinguish one element from another. Note that the words first and second are used here and elsewhere for labelling purposes only and are not intended to denote any specific spatial or temporal ordering. Furthermore, the labelling of a first element does not imply the presence of a second element.

Exemplary hearing devices and methods are set out in the following items.

Item 1. A hearing device comprising
- a processing unit configured to compensate for hearing loss of a user of the hearing device;
- a memory unit; and
- an interface, wherein the hearing device is configured to operate according to security settings of the hearing device, the security settings of the hearing device being stored in the memory unit, and wherein the processing unit is configured to
- obtain new security settings via the interface, the new security settings comprising a new first hearing device key identifier indicative of a hearing device key;
- verify the new security settings; and
- update, if the new security settings are verified, the security settings of the hearing device based on the new security settings.

Item 2. Hearing device according to item 1, wherein the new security settings comprise a digital signature, and wherein to verify the new security settings comprises to verify the digital signature of the new security settings.

Item 3. Hearing device according to any of items 1-2, wherein to verify the new security settings comprises to validate the new first hearing device key identifier, and wherein the new security settings are verified if the new first hearing device key identifier is valid.

Item 4. Hearing device according to any items 1-3, wherein the security settings of the hearing device comprise primary security settings including a hearing device certificate, and wherein the hearing device is configured to verify the new security settings based on the primary security settings of the hearing device.

Item 5. Hearing device according to item 4, wherein the primary security settings comprise a first hearing device key identifier, and wherein to verify the new security settings comprises to determine if the new first hearing device key identifier is valid based on the first hearing device key identifier of the primary security settings.

Item 6 Hearing device according to any of items 1-5, wherein the security settings of the hearing device comprise secondary security settings, and wherein the hearing device is configured to verify the new security settings based on the secondary security settings of the hearing device.

Item 7. Hearing device according to item 6, wherein the new security settings comprise a security update identifier, and wherein to verify the new security settings comprises to determine if the security update identifier is valid based on the secondary security settings.

Item 8. Hearing device according to any of items 6-7, wherein to update the security settings of the hearing device comprises to include the new first hearing device key identifier in the secondary security settings.

Item 9. Hearing device according to any of items 1-8, wherein the new security settings comprise one or more client device type revocation identifiers and/or one or more client device revocation identifiers, and/or one or more signing device revocation identifiers.

Item 10. Hearing device according to item 9, wherein to update the security settings of the hearing device comprises to update one or more client device type revocation identifiers and/or one or more client device revocation identifiers, and/or one or more signing device revocation identifiers in secondary security settings of the hearing device.

Item 11. A method of updating a hearing device comprising a processing unit configured to compensate for hearing loss of a user of the hearing device, a memory unit, and an interface, wherein the hearing device is configured to operate according to security settings of the hearing device, the method comprising:
- obtaining new security settings via the interface, the new security settings comprising a new first hearing device key identifier indicative of a hearing device key;
- verifying the new security settings; and
- updating, if the new security settings are verified, the security settings of the hearing device based on the new security settings.

Item 12. Method according to item 11, wherein the new security settings comprise a digital signature, and wherein verifying the new security settings comprises verifying the digital signature of the new security settings.

Item 13. Method according to any of items 11-12, wherein verifying the new security settings comprises validating the new first hearing device key identifier, and wherein the new security settings are verified if the new first hearing device key identifier is valid.

Item 14. Method according to any of items 11-13, wherein the security settings of the hearing device comprise primary security settings including a hearing device certificate, and wherein verifying the new security settings is based on the primary security settings of the hearing device.

Item 15. Method according to item 14, wherein the primary security settings comprise a first hearing device key identifier, and wherein verifying the new security settings comprises determining if the new first hearing device key identifier is valid based on the first hearing device key identifier of the primary security settings.

Item 16. Method according to any of items 11-15, wherein the security settings of the hearing device comprise secondary security settings, and wherein verifying the new security settings is based on the secondary security settings of the hearing device.

Item 17. Method according to item 16, wherein the new security settings comprise a security update identifier, and wherein verifying the new security settings comprises determining if the security update identifier is valid based on the secondary security settings.

Item 18. Method according to any of items 16-17, wherein updating the security settings of the hearing device comprises including the new first hearing device key identifier in the secondary security settings.

Item 19. Method according to any of items 11-18, wherein the new security settings comprise one or more client device type revocation identifiers and/or one or more client device revocation identifiers, and/or one or more signing device revocation identifiers.

Item 20. Method according to item 19, wherein updating the security settings of the hearing device comprises updating one or more client device type revocation identifiers and/or one or more client device revocation identifiers, and/or one or more signing device revocation identifiers in secondary security settings of the hearing device.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES

1 system
2 hearing device
4 processing unit
5 microphone
6 memory unit
7 receiver
8 interface
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
108, 108A security settings certificate
112 hearing device identifier
113 digital signature
114 first hearing device key identifier
115 first set of hearing device keys
115A first primary hearing device key
115B first secondary hearing device key
115C first tertiary hearing device key
115D first quaternary hearing device key
116 second hearing device key identifier
117 second set of hearing device keys
117A second primary hearing device key
117B second secondary hearing device key
117C second tertiary hearing device key
117D second quaternary hearing device key
118 third hearing device key identifier
119 third set of hearing device keys
119A third primary hearing device key
119B third secondary hearing device key
119C third tertiary hearing device key
119D third quaternary hearing device key
130 certificate type identifier
136 signing device identifier
138 hardware platform identifier
140 software platform identifier
142 certificate timestamp
144 client device type authorization identifier
146 token parameter
148 first hardware identifier
170 security update identifier
172 client device type revocation identifier
172A number of client device type revocation identifiers
172B list or array of client device type revocation identifiers
174 client device revocation identifier
174A number of client device revocation identifiers
174B list or array of client device revocation identifiers
176 signing device revocation identifier
176A number of signing device revocation identifiers
176B list or array of signing device revocation identifiers
178 security settings
178A primary security settings
178B secondary security settings
400 signalling diagram
401 new security settings
500 method of updating a hearing device
S1 obtaining new security settings
S2 verifying the new security settings
S3 verification of new security settings OK?
S4 updating the security settings of the hearing device
S5 disregarding the new security settings

The invention claimed is:

1. A method performed by a hearing device having an interface and a processing unit, the method comprising:
obtaining security information;
verifying the security information; and
performing an update based on update information transmitted from an external device, wherein the update is performed after the security information is verified;
wherein the security information comprises a digital signature, and wherein the act of verifying the security information comprises verifying the digital signature;
wherein the act of verifying and the act of performing the update are performed by the processing unit of the hearing device;
wherein the act of verifying the digital signature is performed using a security public key; and
wherein the act of performing the update comprises changing a parameter based on which the hearing device is configured to operate.

2. The method of claim 1, wherein the security information indicates a type of the external device that is authorized to communicate with the hearing device.

3. The method of claim 1, wherein the security information is a part of a security data set comprising one or more of: a hearing device identifier, a hearing device key identifier, a hearing device key, a certificate type identifier, a signing device identifier, a hardware platform identifier, a software platform identifier, a certificate timestamp, a client device type authorization identifier, a token parameter, or a hardware identifier.

4. The method of claim 1, wherein the security information is a part of a certificate.

5. The method of claim 4, wherein the certificate comprises a signing device identifier identifying a signing device that has signed the certificate.

6. A method performed by a hearing device having an interface and a processing unit, the method comprising:

obtaining security information;

verifying the security information; and performing an update based on update information transmitted from an external device, wherein the update is performed after the security information is verified;

wherein the act of verifying and the act of performing the update are performed by the processing unit of the hearing device; and wherein the security information comprises a security update identifier, and wherein the act of verifying the security information comprises verifying the security update identifier.

7. A method performed by a hearing device having an interface and a processing unit, the method comprising:

obtaining security information;

verifying the security information; and performing an update based on update information transmitted from an external device, wherein the update is performed after the security information is verified;

wherein the act of verifying and the act of performing the update are performed by the processing unit of the hearing device; and wherein the security information comprises a version identifier, and wherein the act of verifying the security information comprises verifying the version identifier.

8. The method of claim 7, wherein the security information indicates a type of the external device that is authorized to communicate with the hearing device.

9. The method of claim 7, wherein the security information is a part of a certificate.

10. The method of claim 9, wherein the certificate comprises a signing device identifier identifying a signing device that has signed the certificate.

11. A method performed by a hearing device having an interface and a processing unit, the method comprising:

obtaining security information;

verifying the security information;

performing an update based on update information transmitted from an external device, wherein the update is performed after the security information is verified;

wherein the act of verifying and the act of performing the update are performed by the processing unit of the hearing device; and wherein the security information comprises a certificate type identifier, and wherein the act of verifying the security information comprises verifying the certificate type identifier.

12. The method of claim 11, wherein the security information indicates a type of the external device that is authorized to communicate with the hearing device.

13. The method of claim 11, wherein the security information is a part of a certificate.

14. The method of claim 13, wherein the certificate comprises a signing device identifier identifying a signing device that has signed the certificate.

15. A method performed by a hearing device having an interface and a processing unit, the method comprising:

obtaining security information;

verifying the security information; and performing an update based on update information transmitted from an external device, wherein the update is performed after the security information is verified;

wherein the security information comprises a digital signature, and wherein the act of verifying the security information comprises verifying the digital signature;

wherein the act of verifying and the act of performing the update are performed by the processing unit of the hearing device;

wherein the act of verifying the digital signature is performed using a security public key; and wherein the act of performing the update comprises storing the update information in the hearing device.

16. The method of claim 15, wherein the security information indicates a type of the external device that is authorized to communicate with the hearing device.

17. The method of claim 15, wherein the security information is a part of a security data set comprising one or more of: a hearing device identifier, a hearing device key identifier, a hearing device key, a certificate type identifier, a signing device identifier, a hardware platform identifier, a software platform identifier, a certificate timestamp, a client device type authorization identifier, a token parameter, or a hardware identifier.

18. The method of claim 15, wherein the security information is a part of a certificate.

19. The method of claim 18, wherein the certificate comprises a signing device identifier identifying a signing device that has signed the certificate.

* * * * *